United States Patent [19]
Åström et al.

[11] Patent Number: 5,752,188
[45] Date of Patent: May 12, 1998

[54] UNSTRUCTURED SUPPLEMENTARY SERVICE DATA FROM A HOME LOCATION REGISTER TO AN EXTERNAL NODE

[75] Inventors: Bo A. V. Åström, Hägersten; Björn A. Svennesson, Danderyd, both of Sweden

[73] Assignee: Telefonaktiebolaget LM Ericsson, Stockholm, Sweden

[21] Appl. No.: 363,027

[22] Filed: Dec. 23, 1994

[51] Int. Cl.$^6$ .................................................. H04Q 7/22
[52] U.S. Cl. ................................................................ 455/433
[58] Field of Search ............................ 379/58, 59, 60, 379/61, 63; 455/33.1, 33.2, 54.1, 433

[56] References Cited

U.S. PATENT DOCUMENTS

| | | |
|---|---|---|
| 4,964,156 | 10/1990 | Blair . |
| 5,105,197 | 4/1992 | Clagett . |
| 5,177,780 | 1/1993 | Kasper et al. . |
| 5,243,645 | 9/1993 | Bissell et al. . |
| 5,428,665 | 6/1995 | Lantto ........................................ 379/58 |
| 5,557,655 | 9/1996 | Lantto ........................................ 379/58 |
| 5,657,374 | 8/1997 | Russell et al. ........................... 455/422 |

FOREIGN PATENT DOCUMENTS

| | | |
|---|---|---|
| 0459337 | 12/1991 | European Pat. Off. . |
| 622 928 A1 | 11/1994 | European Pat. Off. . |
| WO91/18483 | 11/1991 | WIPO . |
| WO92/17950 | 10/1992 | WIPO . |
| WO93/16547 | 8/1993 | WIPO . |
| WO94/10813 | 5/1994 | WIPO . |
| WO94/10814 | 5/1994 | WIPO . |

OTHER PUBLICATIONS

Gandils, et al, front of WO009521509A1, Aug. 1995.

M. Hientz et al., "Der Short Message Service—Ein Neur Dienst Der Digitalen Mobilkommunication", *ITG—Fachbericht*, No. 124, Sep. 1993 Berlin (DE), pp. 517–526, XP 000443970.

Dittrich et al., "Implementation of Data Service into GSM" *Telecom Report International, IEEE*, vol. 15, No. 2, pp. 30–33, 1992.

Dittrich et al., "Implementation of the GSM Data Services Into the Mobile Radio System", *MRC Mobile Radio Conference, IEEE*, Abstract Only, 1991.

GSM Recommendation 09.02, Version 4.5.0, pp. 2–30, 1994.

GSM Recommendation 09.02, Version 4.6.0, pp. 295–308, 1994.

European Digital Cellular Telecommunications System (Phase 2); Technical Realization of the Short Message Service (SMS) Point to Point (PP), *European Telecommunication Standard*, GSM Recommendation 03.40, Version 4.7.0, pp. 1–103, Oct. 1993.

"Example Protocol Stacks for Interconnection SCs and MSCs", GSM Recommendation 03.47, Version 4.1.0, pp. 1–56, Apr. 1993.

(List continued on next page.)

*Primary Examiner*—Curtis Kuntz
*Assistant Examiner*—Michael B. Chernoff
*Attorney, Agent, or Firm*—Burns, Doane, Swecker & Mathis, L.L.P.

[57] ABSTRACT

A system and method is provided for controlling the signalling between the subscriber of a mobile station and an external service node such as a message center. The control of the signalling is carried out by using unstructured supplementary service data (USSD) which is analyzed by a USSD handler of a home location register which invokes a transparent transfer to external service node (TTEN) application when the USSD does not correspond to a service defined within the home location register. The TTEN application establishes a dialog with the subscriber of the mobile station and the desired external service node by using USSD. This allows the subscriber of the mobile station to access all message services by sending one service code. Also, the operator is not busy while accessing the services and any incoming calls may be answered while accessing the services.

32 Claims, 6 Drawing Sheets

OTHER PUBLICATIONS

"European Digital Cellular Telecommunication System (Phase 2); Stage 1 Description of Unstructured Supplementary Service Data (USSD)", *European Telecommunications Standard Institute*, GSM Recommendation 02.09, Version 4.0.1, pp. 3–8, Oct. 1993.

"Technical Realization of Unstructured SS Data Operation", GSM Recommendation 03.90 Version 4.0.0, pp. 1–31, Sep. 1993.

"European Digital Cellular Telecommunication System (Phase 2); Mobile Radio Interface Layer 3 Unstructured Supplementary Service Data Operations Specification", *European Telecommunications Standards Institute*, GSM Recommendation 04.90, Version 4.0.0, pp. 1–14, Sep. 1993.

"European Digital Cellular Telecommunications System (Phase 2): Man–Machine Interface (MMI) of the Mobile Station (MS)" *European Telecommunications Standards Institute*, GSM Recommendation 02.30, Version 4.10.0, pp. 1–27, Oct. 1993.

GSM Recommendation 09.02, Version 4.6.0, pp. 268–274; 158–170; 75–78; 63; 583–640; 352–353; and 423–424, 1994.

ETSI/PT 12: ETSI/TC GSM, Release note, Recommendation GSM 09.02, Jan. 1991 (01.91), appendix i, section 6.2, "Handling of Process Unstructured SS Data".

I. Dittrich et al., Mobile Radio Conference, vol., Nov. 1991, (Nice, France), "Implementation of the GSM data services into the mobile radio system", pp. 77–83.

UNSTRUCTURED SUPPLEMENTARY SERVICE DATA FROM A HOME LOCATION REGISTER TO AN EXTERNAL NODE

BACKGROUND

The present invention is directed to a system and method for controlling the signalling in a global system for mobile communication (GSM) public land mobile network (PLMN) between a mobile station or a subscriber and an external node by using unstructured supplementary service data (USSD). The present invention can also be applied in similar systems, such as a personal communication system (PCS) 1900, by using USSD. More particularly, the system and method provide a text-based interaction between the mobile station or the subscriber and the external node with a transparent transfer to external nodes (TTEN) application by using USSD.

FIG. 1 generally illustrates a GSM network having base station controllers $BSC_n$ $30_n$ connected to base station transceivers $BTS_n$ $50_n$ via communication links L. Each base station transceiver $BTS_n$ $50_n$ is located in an associated cell $C_n$ $60_n$ of the network wherein the network is illustrated as a honeycomb structure with each hexagon representing one of the cells $C_n$ $60_n$. The GSM network also includes a mobile services switching center MSC having a visitor location register VLR and a home location register HLR 20. Furthermore, external nodes 1, 2, . . . n are shown as communicating with the HLR 20. The external nodes 1, 2, . . . n represent external service nodes that are external to the PLMN. The MSC/VLR 10 is illustrated as being a single entity because the connection therebetween is well-known. Also, the MSC/VLR 10 is shown to communicate with the $BSC_n$ $30_n$ via an interface 1. The MSC/VLR 10 and the HLR 20 communicate by an interface 2. The interface 1 is an A-interface or base station system application part (BSSAP) and the interface 2 is a mobile application part (MAP) which is a signalling protocol used for roaming and handover signalling in GSM. A subscribing MS 70 is illustrated in FIG. 1 which belongs to the HLR 20 in a home network where permanent subscriber data is stored. The external nodes 1, 2, . . . n communicate with the HLR 20 by an interface 4. The interface 4 corresponds to a modified MAP, which is modified for security and identification purposes.

The basic operation of the GSM network is well-known and will be generally discussed for background purposes. When the MS 70 is registered in the MSC/VLR 10 as a new visitor, the HLR 20 corresponding to the MS 70 sends a copy of the relevant subscriber data to the MSC/VLR 10. The data is sent from the HLR 20 to the MSC/VLR 10 via the interface 2 which is a known MAP protocol used for this GSM cellular standard, using a CCITT signalling system No. 7 address. The procedures for sending the data are described in the MAP specified in GSM Recommendation 09.02 which is hereby incorporated by reference. The data structure in the MAP includes supplementary service (SS)-codes with specified user interaction procedures which are data types identifying supplementary services. Essentially all of the supplementary services in the GSM network are identified by SS-codes. Data is stored locally for each supplementary service in the MSC/VLR 10.

Presently, various message services without defined user interaction procedures, such as fax mail and voice mail, are offered to MS subscribers. In order to perform a user interaction with these message services, the subscriber of the MS must dial a number as defined by the operator of the message service.

The interaction between the message service and the MS is carried out by using DTMF signalling from the MS and synthesized speech from the message service. For example, this interaction is usually performed by a computer generated voice informing the MS subscriber that two voice mail messages are waiting and that by pressing the digit "1", these voice mail messages may be listened to. Because the MS subscriber must dial an ordinary number and listen to information that may not be necessary, this procedure is complicated and not user-friendly. Since the MS is switched between listening and keying positions, the "dialog" with the message service is cumbersome. Furthermore, the MS is busy when the subscriber is accessing the service and a voice channel is occupied for the duration of the service as a result.

A mechanism for allowing text-based user interaction between the GSM PLMN applications and the MS in a transparent way through the network is USSD. USSD may be initiated both by the GSM network and the MS subscriber. In network initiated USSD, the GSM network may either request information from the MS or text strings may be simply sent to the MS where only an acknowledgement is required from the MS. In mobile initiated USSD, a request is made towards the GSM network. In GSM phase 1, which is presently in use, only the MS may initiate USSD while the network may only reply to MS-initiated USSD. However, in GSM phase 2, both the network and the MS may initiate USSD and a dialog may be established.

A further description of USSD follows with respect to a service code (SC). The SC is generated by the MS or the subscriber and includes digits, letters, and/or signs that do not correspond to a telephone number. Any SC that is not defined in the MS is interpreted as USSD by the MS. When an MS or a subscriber generates the SC, the MS performs the corresponding operations when the SC is recognized or the SC is treated as USSD when the SC is unrecognized. The USSD is sent to the MSC/VLR on a signalling channel. In the MSC/VLR, the SC is analyzed in a USSD handler. If the SC is recognized in the USSD handler, the corresponding action is performed. However, if the SC is unrecognized in the USSD handler, then the SC is sent to the HLR. Thereafter, the USSD signalling is terminated in the HLR in the conventional GSM network which makes it impossible to use USSD outside of the PLMN. Accordingly, any function that uses USSD signalling in known GSM networks, must be implemented in the MSC/VLR or the HLR which can lead to cumbersome or complicated solutions at high costs.

As a result, USSD only allows text-based user interaction between the GSM PLMN applications and the MS, but does not allow text-based user interaction between external nodes and the MS in the conventional GSM network. Thereby, a voice channel must be occupied for the duration of the service to establish a dialog between the MS and the desired external node so that it is not possible to talk on a mobile telephone while simultaneously accessing an external service. For ordinary mobile telephones, this is usually not a disadvantage. However, for mobile stations with external speakers and microphones or mobile stations integrated in notebook computers, the ability to talk while accessing information services at the same time over the mobile station is very desirable.

SUMMARY

An object of the present invention is to provide a system and method for controlling the signalling between a mobile station or a subscriber and an external service node by the use of unstructured supplementary service data.

Another object of the present invention is to provide a system and method which invokes a transparent transfer to an external node by a home location register in response to the unstructured supplementary service data so that a dialog may be created between a mobile station or a subscriber and an external service node.

Another object of the present invention is to provide text based user interaction between external services and a mobile station or a subscriber.

The objects of the present invention are fulfilled by providing a system for controlling the signalling between external nodes and a mobile station an unstructured supplementary service data (USSD) handler for analyzing USSD in a home location register (HLR) to determine whether said USSD corresponds to defined HLR applications and a transparent transfer unit (TTU) for establishing a transparent transfer to external nodes (TTEN) application between one of the external nodes defined by said USSD and the mobile station when said HLR handler determines that said USSD fails to correspond to any of said defined HLR applications.

The objects of the present invention are also fulfilled by providing a system for controlling the signalling between external nodes and a mobile station comprising a home location register (HLR) handler for analyzing unstructured supplementary service data (USSD) and interacting means for establishing a text based user interaction between the external nodes and the mobile station responsive to said USSD.

The system and method of the present invention provide a text-based user interaction between the external nodes and the mobile station or the subscriber in a transparent way by establishing a dialog between the mobile station and the external nodes by unstructured supplementary service data. Thereby, a signalling channel is used to communicate between the HLR and the external nodes so that the subscriber is not busy while accessing services at the external nodes and the mobile station is available to answer incoming calls.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, the thus are not limitative of the present invention, wherein.

DETAILED DESCRIPTION

Figure 1:
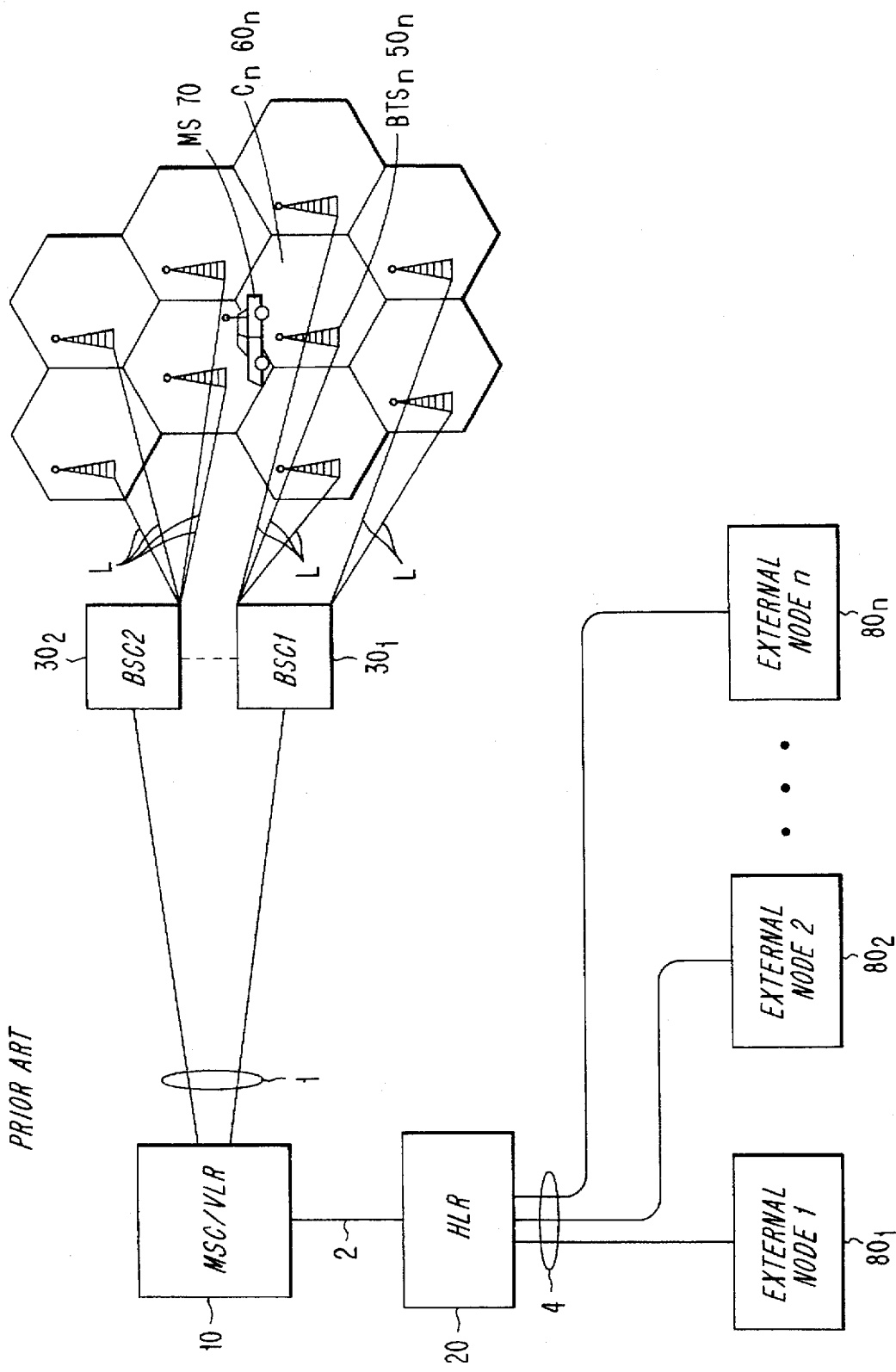
FIG. 1 illustrates a conventional GSM network.

An embodiment of the present invention will be described with reference to FIG. 2. A subscribing MS 170 communicates with an MSC/VLR 110 in a similar manner as described for the conventional GSM network of FIG. 1. 100 represents known interfaces and elements between the MS subscriber 170 and the MSC/VLR 110 as described in FIG. 1 and a further description of these interfaces and elements are not provided based on the description in FIG. 1. The MSC/VLR 110 in the present embodiment includes a USSD handler 112. The MSC/VLR 110 communicates with the HLR 120 by an interface 102 in a known manner as described for the interface 2 in FIG. 1. The HLR 120 includes a USSD handler 122. A transparent transfer (TTU) 130 is connected to the HLR 120. The TTU 130 selectively communicates with a plurality of external nodes 1, 2, ... n as represented via an interface 104, such as a modified MAP for example, in response to the received USSD as will be described below in more detail.

A description of the system illustrated in FIG. 2 will be described with reference to the flow chart of FIG. 3. At step S10, an SC is generated by the MS 170. At step S12, the MS 170 determines whether the SC is recognized. If the SC is recognized, the corresponding applications are performed at step S14 before the procedure ends at step S200. If the SC is not recognized by the MS 170 at step S12, the SC is sent from the MS 170 to the MSC/VLR 110 at step S20. The USSD handler 112 of the MSC/VLR 110 analyzes the SC sent. If the SC is recognized by the USSD handler 112 at step S30, the applications corresponding to this SC are performed at step S40 and then the procedure ends at step S200. If the SC is not recognized by the USSD handler 112 at step S30, the SC is sent to the HLR 120 over a conventional communication link 102 at step S50.

At step S60, the USSD handler 122 of the HLR 120 analyzes the USSD to determine whether a corresponding application is defined within the HLR 120. If the USSD is recognized as being directed to an application defined within the HLR 120, the actions corresponding to the USSD will be performed at step S70 before the procedure ends at step S200. However, if the USSD is not recognized as being directed to a service defined within the HLR 120 at step S60, the USSD is sent to the TTU 130 which initiates a USSD application referred to as a "transparent transfer to external service nodes" (TTEN) application at step 65. Next in the TTEN application, the USSD is compared with a predefined list in the TTU 130 to determine which of the external nodes 1, ... n should be accessed at step S80. At step S90, the TTEN application performed by the TTU 130 establishes a dialog between the MS 170 and the desired external node as defined by the USSD. Accordingly, the TTEN application allows the HLR 120 to only relay the USSD components between the MS 170 and the desired external node. This dialog exists until either the external node or the MS 170 sends a message to the TTU 130 which requests that this dialog be terminated. At step S100, the TTU 130 determines whether the dialog termination message has been received. If the dialog termination message has been received by the TTU 130, the procedure ends at step S200. However, if the dialog termination message has not been received by the TTU 130, this dialog remains and the TTU 130 continues to supervise the dialog to determine whether the dialog termination message has been received at step S100.

The present embodiment is directed to the case where the services external to the PLMN are all located on one external service node so that the established TTEN application needs only to relay all of the USSD between the one external service node and the MS 170. The external service node where the application resides is responsible for all signalling towards the MS 170 while either the external service node or the MS 170 is responsible for the termination of the dialog established for the application. When the MS 170 initiates a USSD which is determined by the TTU 130 to invoke the TTEN application, the HLR 120 sends subscriber identification together with the USSD towards the desired external node, using a modified MAP protocol. The MAP protocol being modified for security and identification purposes.

Figure 2:
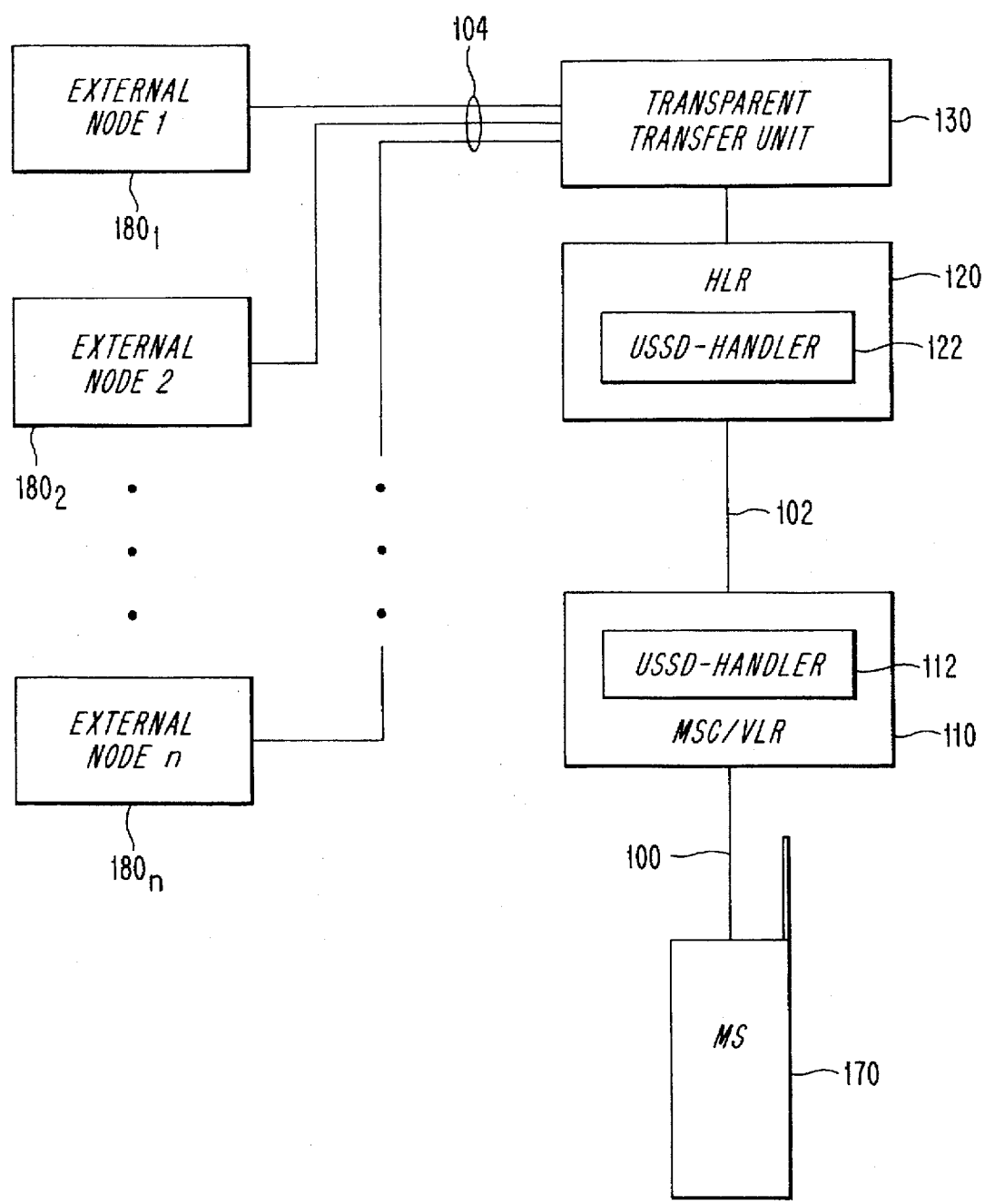
FIG. 2 illustrates a GSM network for an embodiment of the present invention.
Figure 3:
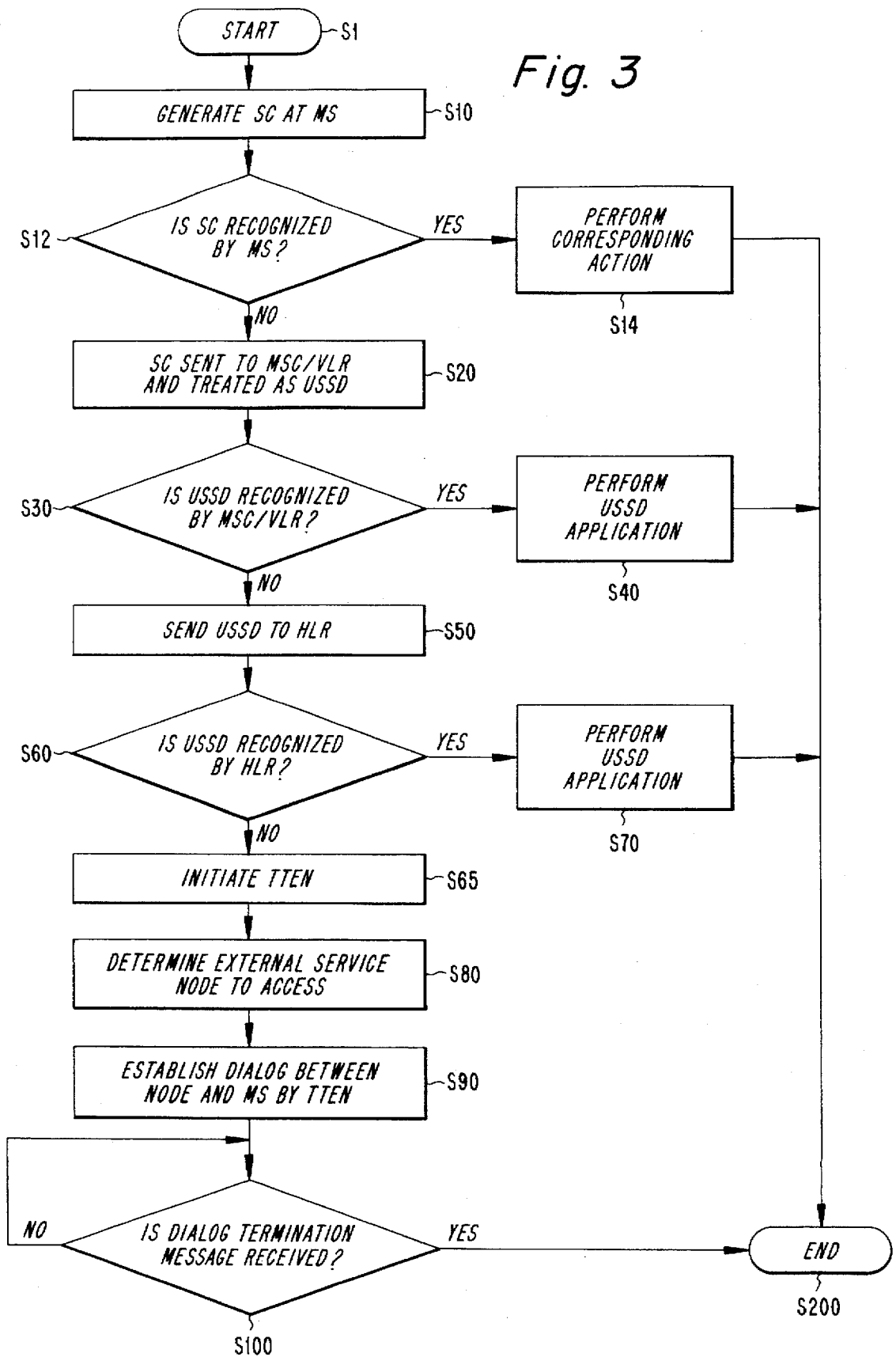
FIG. 3 illustrates a flow chart for an embodiment of the present invention.
Figure 4:
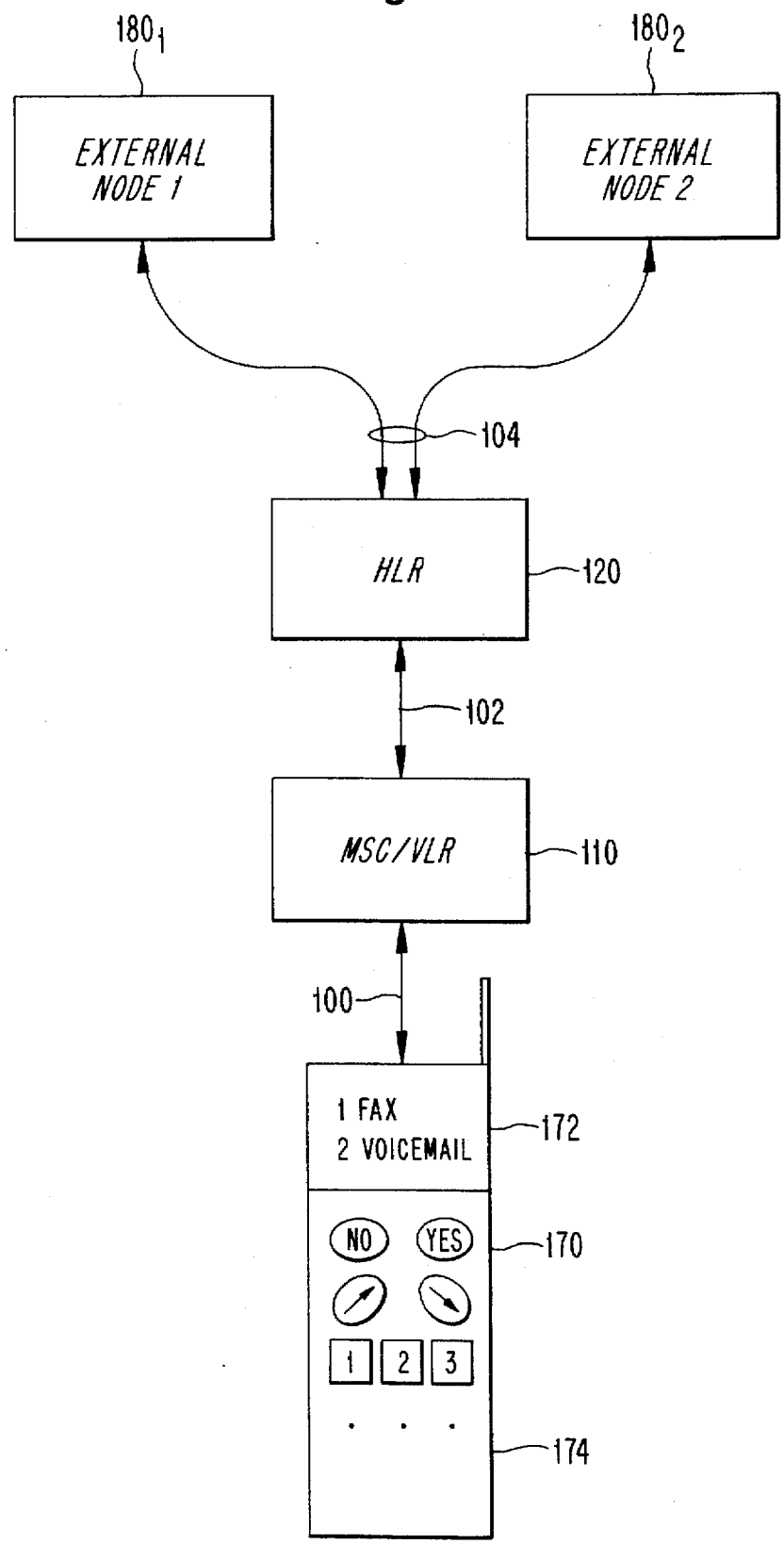
FIG. 4 illustrates an embodiment of the present invention which uses the main menu feature.

Although the embodiment discussed with reference to FIG. 3 is directed to the case where the subscriber services are all located in one external node so that the TTEN application needs to only relay all of the USSD between the desired external node and the MS 170, the system illustrated in FIG. 2 is also able to handle several external nodes on a subscriber number series basis. When several external nodes each contain various services, the TTU 130 acts as a main interface towards the MS 170 by producing an interface where the subscriber of the MS 170 may choose from different services on a main menu. FIG. 4 illustrates an example of a main menu display 172 and a keyboard 174 on the MS 170 for an embodiment of the present invention. The main menu display 172 allows the subscriber of the MS 170 to select by the keyboard 174 between the external node 1 corresponding to a voice mail service and the external node 2 corresponding to a fax mail service in this example.

The TTU 130 sets up a dialog to the corresponding external node for each of the choices displayed on the main menu display 172. After setting up the dialog to the desired external node, the TTU 130 is passive and only relays messages between the desired external node and the MS 170. When either the desired external service node or the MS 170 requests that the connection be terminated, the TTU 130 cuts the connection to the external service node, but remains in contact with the MS 170 by offering other services until the MS 170 requests that this connection to the TTU 130 be terminated. As a result, all interaction between the subscriber of the MS 170 and the external services can be performed by using menus where choices are made by simple keying operations on the keyboard 174 using text based menus so that all message services may be accessed by sending one SC. This reduces the time necessary for accessing a service and makes it easier for the MS 170 to determine the status of the services.

Also, a signalling channel instead of a traffic channel is used to access the external services which means that the MS 170 is not busy while accessing the external services and may be available to answer any incoming calls. Thereby, it is possible to talk on a mobile telephone while simultaneously accessing a service. This is extremely advantageous for mobile stations having external speakers and microphones and mobile stations with integrated notebook computers so that the operator is able to talk at the same time as accessing information services such as stock or weather information, for example.

Figure 5:
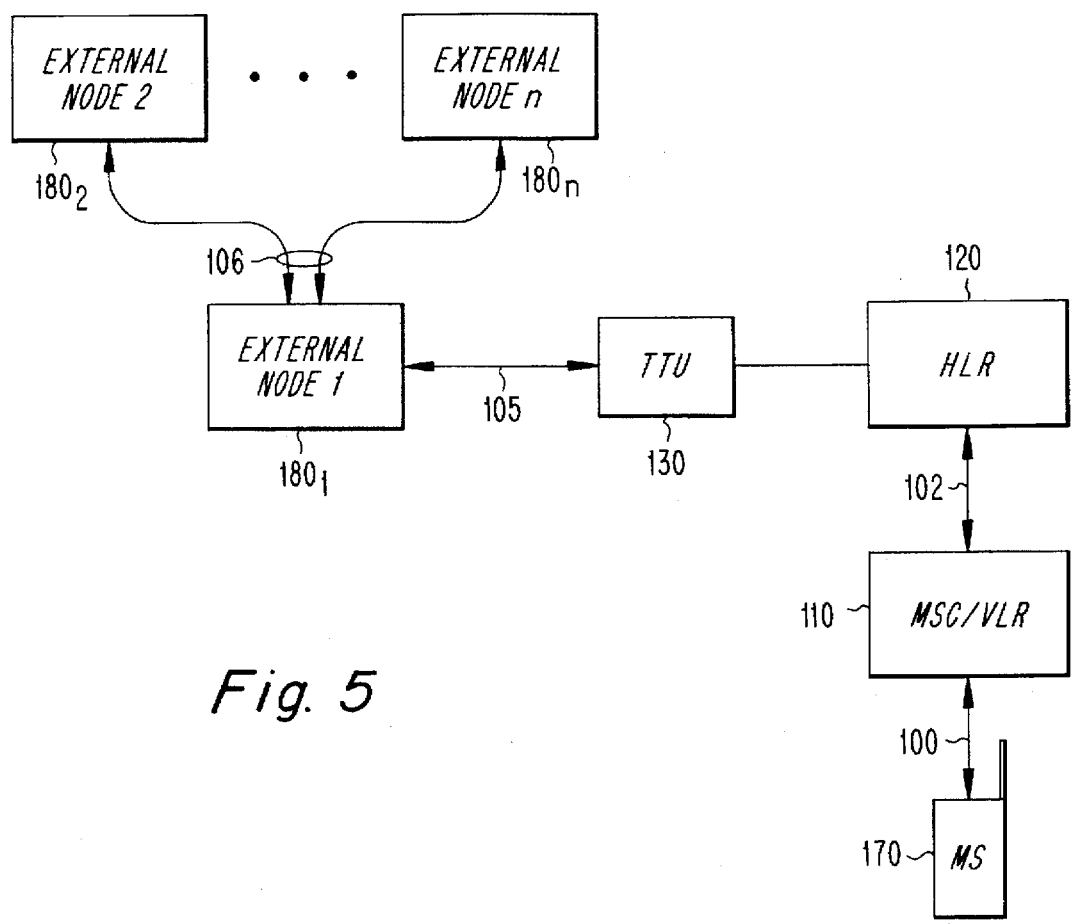
FIG. 5 illustrates another embodiment of the present invention where the HLR and an external node effectively perform the TTEN application.

Another embodiment of the present invention for implementing the main menu is illustrated in FIG. 5 where the HLR 120 essentially functions as a "stupid" HLR. In other words, if the USSD is unrecognized, the HLR 120 always sends the USSD to the external node 1 by the TTEN application via the TTU 130 in this example. Thereafter, the external node 1 acts as the main interface and provides the main menu for external nodes 2, . . . n. In effect, the TTEN application exists in both the TTU 130 and the external node 1 over an interface 105 and then the main interface between the external node 1 and the external nodes 2, . . . n is provided an interface 106.

Figure 6:
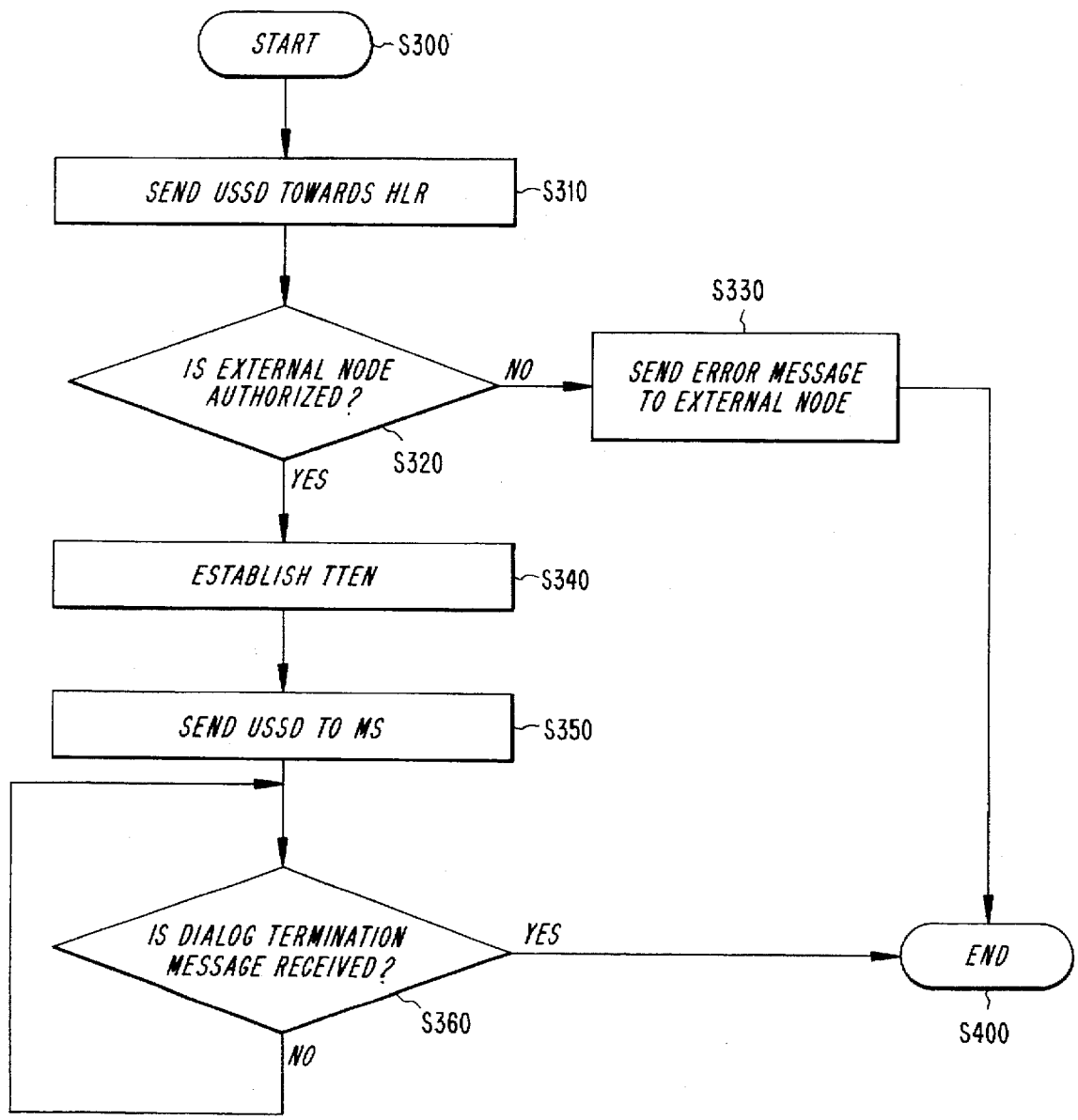
FIG. 6 illustrates a flow chart for an embodiment of the present invention where the TTEN application is performed for network initiated USSD.

A still further embodiment of the present invention is illustrated in FIG. 6 for network initiated USSD. In network initiated USSD, the HLR 120 functions either as a directory to obtain the location of the MS 170 or as an element which sets up a dialog to the MSC/VLR 110 and the MS 170 (effectively a reverse operation of mobile initiated USSD). The HLR 120 also authorizes the external nodes before allowing USSD signalling to the MS 170. The flow chart of FIG. 6 illustrates sending the USSD along with the identity of the desired MS from one of the external nodes to the TTU 130 at step S310. Next, a determination is made at step S320 to determine whether the sending node is authorized to access the desired MS. If the sending node is not authorized to access the desired MS, an error message is sent to the external node at step S330 before the procedure ends at step S400. If the sending node is authorized to access the desired MS, the TTU 130 establishes a TTEN application at step S340 to the desired MS. At step S350, the USSD is sent to the MS 170 via the MSC/VLR 110. The TTU 130 determines at step S360 whether a dialog termination message has been received from either the sending node or the desired MS. If the dialog termination message has been received by the TTU 130, the procedure ends at step S400. However, if the dialog termination message has not been received by the TTU 130, the dialog between the sending node and the desired MS remains and the TTU 130 continues to supervise the dialog to determine whether the dialog termination message has been received at step S400.

Figure 7:
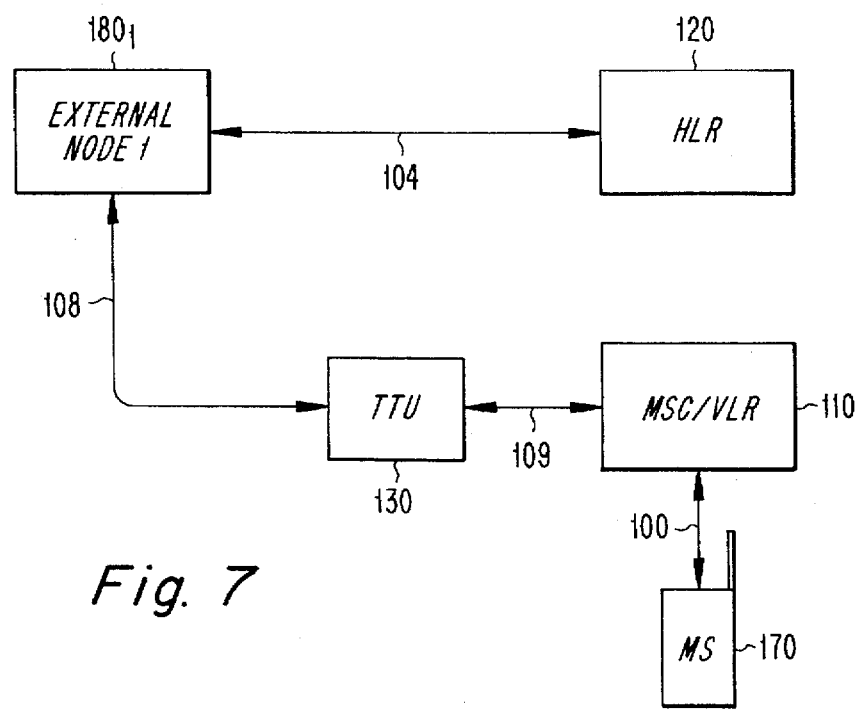
FIG. 7 illustrates an embodiment of the present invention where the HLR functions as a directory for network initiated USSD.

An example where the HLR 120 functions as a directory is illustrated in FIG. 7. When the USSD is initiated at an external node 1, for example, the address for the MS 170 is obtained from the HLR 120. The HLR 120 is basically functioning as a directory, which generates a CCITT signalling system No. 7 address for example, in this embodiment. The USSD and the address are then sent to the MSC/VLR 110 corresponding to the MS 170 via the TTU 130. In this embodiment, the TTU 130 becomes selectively connected between the external node 1 and the MSC/VLR 110 with interfaces 108 and 109 in response to the address obtained from the HLR 120. By obtaining the CCITT signalling system No. 7 address from the HLR 120, it is possible to direct USSD to the MSC/VLR 110 corresponding to the MS 170. As a result, the TTEN application for network initiated USSD is performed by the TTU 130 through the MSC/VLR 110, and not through the HLR 120 as in the previous embodiments directed to mobile initiated USSD.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A system for controlling the signalling between external nodes and a mobile station comprising:

an unstructured supplementary service data (USSD) handler for analyzing USSD in a home location register (HLR) to determine whether said USSD corresponds to defined HLR applications; and a transparent transfer unit for establishing a transparent transfer to external nodes (TTEN) application between one of the external nodes defined by said USSD and the mobile station when said USSD handler determines that said USSD fails to correspond to any of said defined HLR applications.

2. A system according to claim 1, wherein said USSD handler delivers said USSD to a HLR processor for performing the services defined by said USSD when said USSD handler determines that said USSD corresponds to one of said defined HLR applications.

3. A system according to claim 1, wherein said USSD is sent on a signalling channel.

4. A system according to claim 1, wherein said one external node or the mobile station sends a message to said transparent transfer unit to request termination of said TTEN application.

5. A system according to claim 1, wherein said transparent transfer unit acts as a main interface when a plurality of the external nodes contain services.

6. A system according to claim 5, wherein said transparent transfer unit establishes a dialog between the mobile station and one of the external nodes containing services and relays messages therebetween until said one external node or the mobile station requests termination, the mobile station and said transparent transfer unit remaining in communication after termination is requested.

7. A system according to claim 1, wherein one of the external nodes acts as a main interface when a plurality of external nodes contain services.

8. A system according to claim 1, wherein the external nodes comprise message centers.

9. A system according to claim 1, wherein the mobile station comprises an integrated computer notebook.

10. A system for controlling the signalling between external nodes and a mobile station comprising:

a switching center for receiving unstructured supplementary service data (USSD) from the mobile station, said switching center including a first USSD handler for determining whether said USSD corresponds to predetermined switching center applications, said switching center performing the application corresponding to said USSD when said first USSD handler determines that said USSD corresponds to one of said predetermined switching center applications;

a home location register (HLR) for receiving said USSD from said switching center when said first USSD handler determines that said USSD fails to correspond to one of said predetermined switching center applications, said home location register including a second USSD handler for determining whether said USSD corresponds to predetermined HLR applications; and a transparent transfer unit for establishing a transparent transfer to external nodes (TTEN) application between one of the external nodes defined by said USSD and the mobile station when said second USSD handler determines that said USSD fails to correspond to any of said predetermined HLR applications.

11. A system according to claim 10, wherein said switching center further comprises a switching center processor for performing said predetermined switching center applications defined by said USSD when said first USSD handler determines that said USSD corresponds to said predetermined switching center applications and said HLR further comprises a HLR processor for performing said predetermined HLR applications defined by said USSD when said second USSD handler determines that said USSD corresponds to said predetermined HLR applications.

12. A system according to claim 10, wherein said switching center further comprises a visitor location register.

13. A system according to claim 10, wherein said transparent transfer unit acts as a main interface when a plurality of the external nodes contain services by developing a main menu of services.

14. A system according to claim 13, wherein said transparent transfer unit establishes a dialog between the mobile station and one of the external nodes containing services as selected from said main menu of services and relays messages therebetween until said one external node or the mobile station requests termination, the mobile station and said transparent transfer unit remaining in communication after termination is requested.

15. A system according to claim 10, wherein one of the external nodes acts as a main interface when a plurality of external nodes contain services by developing a main menu of services.

16. A system for controlling the signalling between external nodes and a mobile station comprising:

an unstructured supplementary service data (USSD) handler for analyzing USSD within a network to determine whether said USSD corresponds to predetermined network applications; and a transparent transfer unit for transferring in and out of said network to establish a dialog between the mobile station and one of the external nodes defined by said USSD when said USSD fails to correspond to any of said predetermined network applications.

17. A system according to claim 16, wherein said transparent transfer unit establishes a transparent transfer to external nodes (TTEN) application which transfers out of said network for mobile initiated USSD and transfers into said network for network initiated USSD.

18. A system for controlling the signalling between external nodes and a mobile station comprising:

a home location register (HLR) for sending an address of the mobile station to one of the external nodes which initiates unstructured supplementary service data (USSD) for establishing a dialog between the mobile station and said one external node; and a transparent transfer unit selectively connected to a switching center corresponding to the mobile station in response to said address for establishing a transparent transfer to external nodes (TTEN) application between said one external node and the mobile station by said USSD.

19. A system according to claim 18, wherein said address sent from said HLR is a CCITT signalling system No. 7 address.

20. A method for controlling the signalling between external nodes and a mobile station comprising the steps of:

(a) analyzing unstructured supplementary service data (USSD) by an USSD handler in a home location register (HLR) to determine whether said USSD corresponds to defined HLR applications; and (b) establishing a transparent transfer to external nodes (TTEN) application between one of the external nodes defined by said USSD and the mobile station by a transparent transfer unit when said USSD handler determines that said USSD fails to correspond to any of said defined HLR applications.

21. A method according to claim 20, further comprising the step of delivering said USSD to a HLR processor for performing the services defined by said USSD when said USSD handler determines at said step (a) that said USSD corresponds to one of said defined HLR applications.

22. A method according to claim 20, further comprising the step of sending a message from said one external node or the mobile station to said transparent transfer unit to request termination of said TTEN application.

23. A method according to claim 20, further comprising the step of providing a main interface by said transparent transfer unit when a plurality of the external nodes contain services.

24. A method according to claim 23, further comprising the steps of:

establishing a dialog by said transparent transfer unit between the mobile station and one of the external nodes containing services;

relaying messages between the mobile station and said one external node until said one external node or the mobile station requests termination; and maintaining communication between the mobile station and said transparent transfer unit after termination is requested.

25. A method according to claim 23, further comprising the step of providing a main interface by one of the external nodes when a plurality of external nodes contain services.

26. A method for controlling the signalling between external nodes and a mobile station comprising the steps of:

(a) receiving unstructured supplementary service data (USSD) at a switching center from the mobile station;

(b) determining whether said USSD corresponds to predetermined switching center applications by a first USSD handler included in said switching center;

(c) performing the application corresponding to said USSD when said first USSD handler determines that said USSD corresponds to one of said predetermined switching center applications;

(d) receiving said USSD at a home location register (HLR) from said switching center when said first USSD handler determines that said USSD fails to correspond to one of said predetermined switching center applications;

(e) determining whether said USSD corresponds to predetermined HLR applications by a second USSD handler included in said HLR; and (f) establishing a transparent transfer to external nodes (TTEN) application between one of the external nodes defined by said USSD and the mobile station by a transparent transfer unit when said second USSD handler determines that said USSD fails to correspond to any of said predetermined HLR applications.

27. A method according to claim 26, further comprising the steps of:

performing said predetermined switching center applications defined by said USSD when said first USSD handler determines that said USSD corresponds to said predetermined switching center applications; and performing said predetermined HLR applications defined by said USSD when said second USSD handler determines that said USSD corresponds to said predetermined HLR applications.

28. A method according to claim 26, further comprising the step of providing a main interface when a plurality of the external nodes contain services by developing a main menu of the services.

29. A method according to claim 28, further comprising the steps of:

selecting from said main menu of services to establish a dialog by said transparent transfer unit between the mobile station and one of the external nodes containing services as selected;

relaying messages between the mobile station and said one external node until said one external node or the mobile station requests termination; and maintaining communication between the mobile station and said transparent transfer unit when termination is requested.

30. A method according to claim 26, further comprising the step of providing a main interface by one of the external nodes when a plurality of external nodes contain services by developing a main menu of services.

31. A method for controlling the signalling between external nodes and a mobile station comprising the steps of:

(a) sending an address of the mobile station a home location register (HLR) to one of the external nodes which initiates unstructured supplementary service data (USSD) for establishing a dialog between the mobile station and said one external node;

(b) selectively connecting a transparent transfer unit to a switching center corresponding to the mobile station in response to said address; and (c) establishing a transparent transfer to external nodes (TTEN) application between said one external node and the mobile station by said USSD.

32. A method according to claim 31, wherein said address sent from said HLR at said step (a) is a CCITT signalling system No. 7 address.

* * * * *